(12) United States Patent
Wu et al.

(10) Patent No.: US 9,854,614 B2
(45) Date of Patent: Dec. 26, 2017

(54) METHOD AND APPARATUS FOR ALLOCATING ASSOCIATION IDENTIFIER

(71) Applicant: Huawei Technologies Co., Ltd., Shenzhen (CN)

(72) Inventors: Tianyu Wu, Shenzhen (CN); Changle Li, Xi'an (CN); Hui Han, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/358,904

(22) Filed: Nov. 22, 2016

(65) Prior Publication Data

US 2017/0079077 A1    Mar. 16, 2017

Related U.S. Application Data

(63) Continuation of application No. 14/465,923, filed on Aug. 22, 2014, now Pat. No. 9,538,562, which is a continuation of application No. PCT/CN2013/071815, filed on Feb. 25, 2013.

(30) Foreign Application Priority Data

Feb. 24, 2012 (CN) .......................... 2012 1 0044096

(51) Int. Cl.
*H04W 76/02* (2009.01)
*H04W 8/26* (2009.01)
*H04W 84/12* (2009.01)

(52) U.S. Cl.
CPC .......... *H04W 76/021* (2013.01); *H04W 8/26* (2013.01); *H04W 84/12* (2013.01)

(58) Field of Classification Search
CPC ...... H04W 8/26; H04W 76/021; H04W 84/12
See application file for complete search history.

(56) References Cited

U.S. PATENT DOCUMENTS

| | | | |
|---|---|---|---|
| 7,689,210 B1 | 3/2010 | Bims | |
| 2003/0227893 A1 | 12/2003 | Bajic | |
| 2006/0088019 A1 | 4/2006 | Liebsch | |
| 2009/0016306 A1 | 1/2009 | Wang et al. | |
| 2012/0051312 A1* | 3/2012 | Noh | H04W 76/023 370/329 |
| 2012/0063335 A1* | 3/2012 | Cho | H04W 8/186 370/252 |
| 2012/0155443 A1* | 6/2012 | Cordeiro | H04W 8/005 370/338 |

(Continued)

FOREIGN PATENT DOCUMENTS

| | | |
|---|---|---|
| CN | 1578242 A | 2/2005 |
| CN | 1767487 A | 5/2006 |

(Continued)

OTHER PUBLICATIONS

Machine Translation and Abstract of Chinese Publication No. CN101202769, Jun. 18, 2008, 7 pages.

(Continued)

*Primary Examiner* — Brian D Nguyen
(74) *Attorney, Agent, or Firm* — Conley Rose, P.C.

(57) ABSTRACT

A method and an apparatus for allocating an association identifier, so as to dynamically allocate an association identifier (AID) to a target station. The method according to the embodiments of the present disclosure includes sending, by an access point (AP), an AID allocation message to a target station, where the AID allocation message carries a target AID of the target station, and the target station is a station to be allocated with an AID or a station with an AID to be updated.

8 Claims, 5 Drawing Sheets

(56) References Cited

U.S. PATENT DOCUMENTS

| | | | |
|---|---|---|---|
| 2012/0163264 A1* | 6/2012 | Chu | H04L 61/6022 370/311 |
| 2012/0287850 A1 | 11/2012 | Wentink | |
| 2012/0300684 A1 | 11/2012 | Wentink | |
| 2013/0003689 A1* | 1/2013 | Kwon | H04W 28/16 370/329 |
| 2013/0022032 A1* | 1/2013 | Taghavi Nasrabadi | |
| 2014/0286321 A1 | 9/2014 | Balian et al. | |

FOREIGN PATENT DOCUMENTS

| | | |
|---|---|---|
| CN | 101202769 A | 6/2008 |
| CN | 101617506 A | 12/2009 |
| WO | 2008104095 A1 | 9/2008 |
| WO | 2013048520 A1 | 4/2013 |

OTHER PUBLICATIONS

Wu, T., et al., "Serivice Type Indication in Association," XP017671897, IEEE 802.11-1210612r0, May 2012, 8 pages.
"Part 11: Wireless LAN Medium Access Control (MAC) and Physical Layer (PHY) Specifications," XP055124801, IEEE, 802.11, Jun. 12, 2007, 298 pages.
Chu, L., et al., "Low Collision EDCA," XP068038219, IEEE 802.11-11/0116r0, Jan. 16, 2012, 8 pages.
Kim, J., et al., "AID Reassignment Protocol," XP068038715, IEEE 802.11-12/0364r0, Mar. 2012, 10 pages.
Park, M., et al., "TGah Efficient TIM Encoding," XP068038760, IEEE 802.11-12/388r1, Mar. 2012, 26 pages.
Seok, Y., et al., "AID Assignment Protocol," XP068040142, IEEE 802.11-12/1304r0, Nov. 2012, 18 pages.
Park, M., "Specification Framework for TGah D13.x," XP068053814, IEEE 802.11, Wireless LANs, IEEE 802.11-13/0354r0, Mar. 20, 2013, 66 pages.
Foreign Communication From A Counterpart Application, Chinese Application No. 201210044096.2, Chinese Office Action dated May 27, 2015, 7 pages.
Foreign Communication From A Counterpart Application, European Application No. 13751110.1, Extended European Search Report dated Mar. 2, 2015, 11 pages.
Foreign Communication From A Counterpart Application, PCT Application No. PCT/CN2013/071815, English Translation of International Search Report dated Jun. 6, 2013, 2 pages.
Foreign Communication From A Counterpart Application, PCT Application No. PCT/CN2013/071815, English Translation of Written Opinion dated Jun. 6, 2013, 2 pages.

\* cited by examiner

METHOD AND APPARATUS FOR ALLOCATING ASSOCIATION IDENTIFIER

CROSS-REFERENCE TO RELATED APPLICATIONS

This application is a continuation of U.S. patent application Ser. No. 14/465,923, filed on Aug. 22, 2014, which is a continuation of International Application No. PCT/CN2013/071815, filed on Feb. 25, 2013, which claims priority to Chinese Patent Application No. 201210044096.2, filed on Feb. 24, 2012. The disclosures of the aforementioned applications are hereby incorporated by reference in their entireties.

TECHNICAL FIELD

The present disclosure relates to the field of communications, and in particular, to a method and an apparatus for allocating an association identifier.

BACKGROUND

In an existing wireless local area network (WLAN) system standard, an association identifier (AID) of a station (STA) is a fixed AID that is allocated at a time and perpetually used.

When an STA is associated with an access point (AP), the AP randomly allocates an unused AID to the STA, indicating that the STA is associated with it (the AP). In this way, the STA and the AP start to interact and communicate. In a conventional WLAN Basic Service Set, (BSS), a quantity of STAs is small, a frequency of using an AID is not high, and fixed AIDs do not cause a major impact. However, in an IEEE 802.11ah scenario, allocation of fixed AIDs causes a huge overhead to a system because a large number of STAs exist and ongoing services of each STA may change with time.

SUMMARY

Embodiments of the present disclosure provide a method and an apparatus for allocating an association identifier, so as to dynamically allocate an AID to a target station.

The method for allocating an association identifier provided by the present disclosure includes sending, by an access point AP, an association identifier AID allocation message to a target station, where the AID allocation message carries a target AID of the target station, and the target station is a station to be allocated with an AID or a station with an AID to be updated.

The method for allocating an association identifier provided by the present disclosure includes receiving, by a station, an AID allocation message sent by an AP, where the AID allocation message carries a target AID of the target station; and using, by the station, the target AID to associate with the AP, or using the target AID to update a current AID of the station.

An access point provided by the present disclosure includes an AID sending unit configured to send an association identifier AID allocation message to a target station, where the AID allocation message carries a target AID of the target station, and the target station is a station to be allocated with an AID or a station with an AID to be updated.

A station provided by the present disclosure includes an AID receiving unit configured to receive an AID allocation message sent by an AP, where the AID allocation message carries a target AID of the target station; and an AID using unit configured to use the target AID to associate with the AP, or use the target AID to update a current AID of the station.

As can be seen from the foregoing technical solutions, the embodiments of the present disclosure have the following advantages: In the embodiments of the present disclosure, an access point may send an AID allocation message to a target station, so that the target station updates a current AID of the target station according to a target AID carried in the AID allocation message, and therefore the access point can flexibly perform reasonable allocation of AIDs of stations by using the foregoing communication mechanism to improve operational efficiency of a network system in a scenario in which the AIDs are repeatedly allocated or the AIDs are insufficient; moreover, when the access point compresses a bitmap corresponding to an AID, bitmap compression efficiency can also be improved.

DESCRIPTION OF EMBODIMENTS

Figure 1:
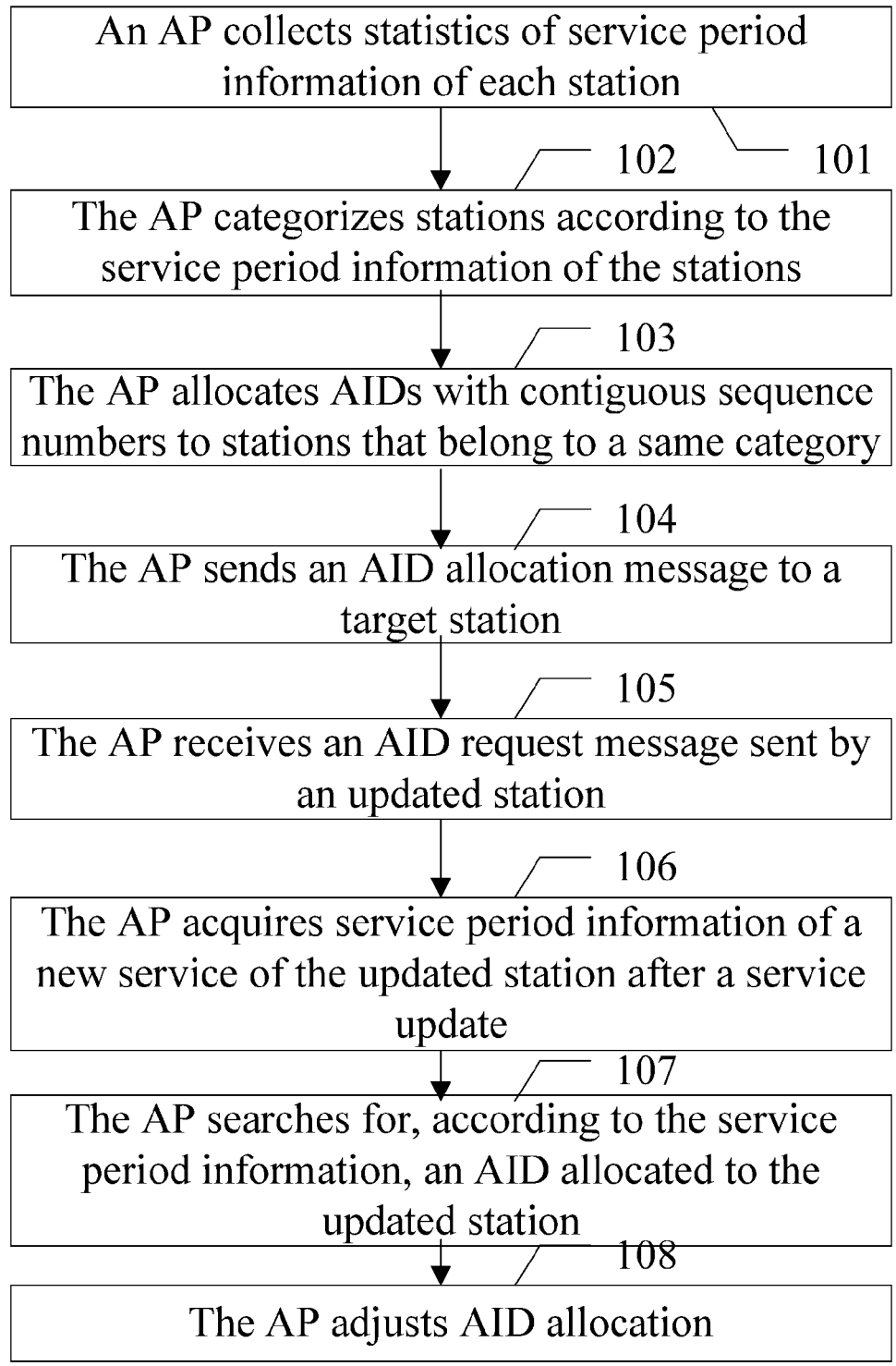
FIG. 1 is a schematic flowchart of a method for allocating an association identifier according to an embodiment of the present disclosure.

Embodiments of the present disclosure provide a method and an apparatus for allocating an association identifier, so as to dynamically allocate an AID to a target station. The method and the apparatus are applied to a wireless local area network system, so that an access point and a user station better perform communication.

An embodiment of the method for allocating an association identifier according to the embodiment of the present disclosure includes.

An AP sends an AID allocation message to a target station, where the AID allocation message carries a target AID of the target station, the target AID is an AID to be used by the target station, and the target station is a station to be allocated with an AID or a station with an AID to be updated.

Optionally, if the target station is a station to which an AID is allocated for the first time, the AID allocation message carries only the target AID of the target station, and the target station uses the target AID to associate with the AP when the target station receives the AID allocation message; and if the target station is not a station to which an AID is allocated for the first time, the AID allocation message may further carry a current AID of the target station, and the target station uses the target AID to update the current AID when the target station receives the AID allocation message.

In the embodiment of the present disclosure, an access point may send an AID allocation message to a target station, so that the target station updates a current AID of the target station according to a target AID carried in the AID allocation message, and therefore the access point can flexibly perform reasonable allocation of AIDs of stations by using the foregoing communication mechanism to improve operational efficiency of a network system in a scenario in which the AIDs are repeatedly allocated or the AIDs are insufficient; moreover, when the access point compresses a bitmap corresponding to an AID, bitmap compression efficiency can also be improved.

In an actual application, before sending downlink data to each STA, an AP needs to notify each STA (notifying that the AP is to deliver the downlink data) by broadcasting a bitmap, where one AID corresponds to one station and one AID corresponds to one bit in the bitmap. If a bit, corresponding to a certain AID, in the bitmap is marked as "1", it indicates that a station corresponding to the AID is to receive the downlink data delivered by the AP; and if a bit, corresponding to the AID, in the bitmap is marked as "0", it indicates that no downlink data is sent to the station corresponding to the AID. In the prior art, fixed AID allocation does not consider a service type of an STA or an AID resource condition. In this case, in an 802.11ah application scenario, a large number of STAs exist, resulting in a very long bitmap, and a large portion of a beacon period needs to be used to transmit the bitmap, resulting in very low system efficiency. Therefore, bitmap compression is quite necessary. Because each bit in the bitmap corresponds to an AID, rationality of the AID directly affects bitmap compression efficiency. Therefore, the fixed AID allocation limits the bitmap compression efficiency, resulting in poor performance of a network system.

An embodiment of the present disclosure provides a mechanism for performing reasonable AID allocation. Referring to FIG. 1, another embodiment of the method for allocating an association identifier according to the embodiment of the present disclosure includes 101: An AP collects statistics of service period information of each station.

The AP collects statistics of the service period information of each station, where the service period information indicates a running period, duration, and various service time-related information of a service of the station. In an actual application, for services with a same service type, the service period information is also the same. Therefore, the AP may also learn the service period information of the station by acquiring a service type and a traffic specification (TSPEC) of the station.

Specifically, the service period information may include a periodic service identifier and service period duration, where the periodic service identifier is used to mark whether the service of the station is a periodic service, and the service period duration is used to indicate duration of an interval between two downlink data transmissions for a service. Optionally, the service period information may further include service duration.

Optionally, in an actual application, the AP may request, by sending a query instruction to each station, each station to report service period information of a current ongoing service of each station; while each station may also actively report the service period information of the current ongoing service of each station to the AP in a periodic manner, or each station reports the service period information to the AP when performing association with the AP. A manner for the AP to collect statistics of the service period information of each station can be determined according to an actual situation, which is not specifically limited herein.

102: The AP categorizes stations according to the service period information of the stations.

The AP categorizes the stations according to the service period information of the stations.

Optionally, a method for categorization may be: Firstly, the AP may distinguish, according to a periodic service identifier, a station running a periodic service from a station running a non-periodic service; secondly, among stations running periodic services, the AP may further categorize stations with same service period duration into one category.

Optionally, after the stations with the same service period duration are categorized into one category, further, among the stations with the same service period duration, stations with same service duration may further be categorized into one category.

It can be understood that another method may also be used to categorize stations according to the service period information. A specific method can be determined according to an actual situation, which is not limited herein.

103: The AP allocates AIDs with contiguous sequence numbers to stations that belong to a same category.

In an actual application, to make AID sequence numbers corresponding to stations that are to receive downlink data within a same time segment be contiguous as far as possible, the AP allocates the AIDs with the contiguous sequence numbers to the stations that belong to the same category.

Specifically, in a process of allocating the AIDs with the contiguous sequence numbers, stations of a major category (an upper-level category is called a major category relative to a lower-level category) are preferentially allocated. For example, relative to the stations with the same service period duration, the stations with the periodic service are stations of a major category; and relative to the stations with the same service duration, the stations with the same service period duration are stations of a major category. Therefore, it is assumed that there are 1500 stations with the periodic service, among which there are 800 stations with the service period duration being 1 minute and 700 stations with the service period duration being 2 minutes. First, AIDs 0 to 1499 are allocated to the stations with the periodic service; then, the AIDs 0 to 799 are allocated to the stations with the service period duration being 1 minute, and the AIDs 800 to 1499 are allocated to the stations with the service period duration being 2 minutes; and finally, the AIDs 0 to 799 and the AIDs 800 to 1499 are separately allocated according to the stations with different service duration.

104: The AP sends an AID allocation message to a target station.

The AP determines the target station according to an AID allocation situation (for example, if a current AID of a station is inconsistent with a newly allocated AID of the station, it can be determined that the station is the target station), and sends the AID allocation message to the target station, where the AID allocation message carries a target AID (that is, the foregoing newly-allocated AID) of the target station, and the target station is a station to be allocated with an AID or a station with an AID to be updated.

Optionally, in an actual application, an overlapping basic service set (OBSS) scenario exists. If two stations within two BSSs are allocated with a same AID, an AID re-allocation mechanism provided by the present disclosure can be used to quickly perform AID re-allocation to avoid a conflict. Specifically, the AP can detect, in a service area of the AP, whether a situation in which a same AID is allocated to two stations within two BSSs exists; and if the situation exists, it is determined that either of the two stations is used as the target station.

Optionally, when a quantity of stations in an area served by the AP is larger than a quantity of AIDs, the AP can detect a station that does not run a service and is allocated with an AID, and allocate the AID of the station that does not run the service and is allocated with the AID to another target station.

Optionally, if the target station is a station to which an AID is allocated for the first time, the AID allocation message carries only the target AID of the target station, and the target station uses the target AID to associate with the AP when the target station receives the AID allocation message; and if the target station is not a station to which an AID is allocated for the first time, the AID allocation message may further carry a current AID of the target station, and the target station uses the target AID to update the current AID when the target station receives the AID allocation message.

Optionally, the AP may send the AID allocation message to each target station one by one in a unicast manner.

Optionally, if there are more than two target stations, the AP may send the AID allocation message to the target stations in a multicast manner, so that the target stations update AIDs according to the AID allocation message and return an AID update acknowledgement. Further, if the target stations do not return the AID update acknowledgement within preset time, after the sending the AID allocation message to the target stations in a multicast manner, it is determined whether there are more than two target stations that do not return the AID update acknowledgement, and if there are more than two target stations that do not return the AID update acknowledgement, framing is further performed for the target stations that do not return the AID update acknowledgement (that is, target AIDs corresponding to the target stations that do not return the AID update acknowledgement are further added into a multicast frame), and the AID allocation message is again sent, in a multicast manner, to the target stations that do not return the AID update acknowledgement; and if there is only one target station that does not return the AID update acknowledgement, framing is performed for the target station that does not return the AID update acknowledgement (that is, a target AID corresponding to the target station that does not return the AID update acknowledgement is further added into a unicast frame), and the AID allocation message is sent, in a unicast manner, to the target station that does not return the AID update acknowledgement.

In a multicast scenario, to send information to a plurality of stations, the AP needs to include AIDs of all target stations in multicast information. If the AID re-allocation mechanism provided by the embodiment of the present disclosure is used, the AIDs of these stations can be contiguously allocated. In this way, when multicast information is subsequently sent to a same group of stations, only a start AID and an end AID need to be included, thereby achieving compression of a data packet and improving information sending efficiency.

105: The AP receives an AID request message sent by a 'station to be updated'.

Optionally, when a service running on a station changes, the station may actively send an AID request message to the AP, so that the AP re-allocates, to the station, an AID matching a new service after the update (an allocation principle is that a sequence number of the newly-allocated AID is contiguous with an AID sequence number of a homogeneous station providing the new service), where the station that actively initiates the AID update is the 'station to be updated'.

The AP receives the AID request message sent by the 'station to be updated'. Optionally, the AID request message may carry service period information of the new service of the 'station to be updated' after the service update.

106: The AP acquires the service period information of the new service of the 'station to be updated' after the service update.

Optionally, the AP acquires the service period information of the new service of the 'station to be updated' after the service update. Optionally, if the AID request message carries the service period information, the service period information is extracted from the AID request message; and if the AID request message carries the service period information, the AP can obtain the service period information of the new service of the 'station to be updated' after the service update by sending a query message to the 'station to be updated'.

107: The AP searches for, according to the service period information, the AID allocated to the 'station to be updated'.

Optionally, after the service period information of the new service of the 'station to be updated' after the service update is obtained, a last station of the same category as the 'station to be updated' and with a maximum AID sequence number is searched for according to the service period information, or a first station of the same category as the 'station to be updated' and with a minimum AID sequence number is searched for.

After the last station or the first station is found, an AID that is one larger than the AID sequence number of the last station is allocated to the 'station to be updated', or an AID that is one smaller than the AID sequence number of the first station is allocated to the 'station to be updated'.

Optionally, if the AID sequence numbers of a plurality of stations of the same category as the 'station to be updated' are not contiguous (that is, idle AIDs exist between the first station and the last station), any idle AID between the AID sequence numbers corresponding to the first station and the last station is selected and allocated to the 'station to be updated'.

108: The AP adjusts AID allocation.

Optionally, if the AID that is one larger than the AID sequence number of the last station and the AID that is one smaller than the AID sequence number of the first station have been allocated, a new AID is allocated to a station corresponding to the AID that is one larger than the AID sequence number of the last station, or a station corresponding to the AID that is one smaller than the sequence number of the first station.

In an actual application, if an original segment of contiguous AIDs of the stations that belong to the same category have all been allocated, the AP can select the station corresponding to the AID that is one smaller than the AID sequence number of the first station or the station corresponding to the AID that is one larger than the AID sequence number of the last station to perform AID adjustment, and re-allocate, to the station, an AID that is contiguous with an AID of a station of the same category as the station.

The access point in the embodiment of the present disclosure may collect statistics of service period information of each station, categorize the stations according to the service period information, and allocate AIDs with contiguous sequence numbers to stations that belong to a same category, so as to make AID sequence numbers corresponding to stations that are about to receive downlink data within a same time segment be contiguous as far as possible, thereby improving bitmap compression efficiency when bitmaps corresponding to the AIDs are compressed (e.g. contiguous "1"s can be compressed).

Figure 2:
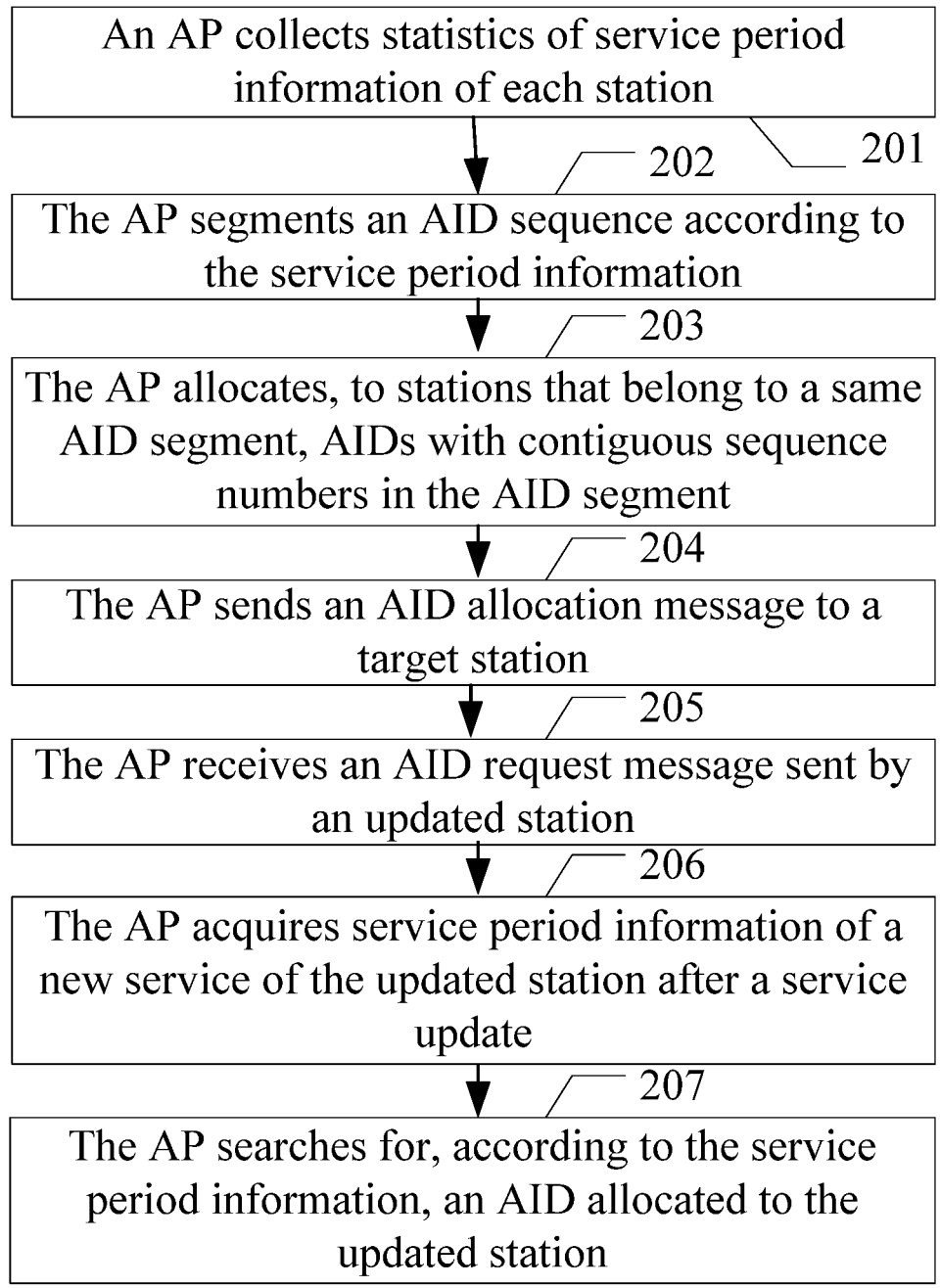
FIG. 2 is another schematic flowchart of a method for allocating an association identifier according to an embodiment of the present disclosure.

An embodiment of the present disclosure further provides another mechanism for performing reasonable AID allocation. Referring to FIG. 2, another embodiment of the method for allocating an association identifier according to the embodiment of the present disclosure includes 201: An AP collects statistics of service period information of each station.

The AP collects statistics of the service period information of each station, where the service period information indicates a running period, duration, and various service time-related information of a service of the station. In an actual application, for services with a same service type, the service period information is also the same. Specifically, the service period information may include a periodic service identifier and service period duration, where the periodic service identifier is used to identify whether the service of the station is a periodic service, and the service period duration is used to indicate duration of an interval between two downlink data transmissions for a service. Optionally, the service period information may further include service duration and a service offset time between stations, where the service offset time between stations is obtained by estimation according to downlink data arrival time of each station.

202: The AP segments an AID sequence according to the service period information.

The AP segments an AID sequence according to the service period information. Specifically, a method for segmenting the AID sequence may be as follows: Firstly, the AP determines a quantity of periodic services and a quantity of non-periodic services according to the periodic service identifier, and segments the AID sequence into a periodic segment and a non-periodic segment according to a ratio of the quantity of the periodic services to the quantity of non-periodic services. When the AID sequence is segmented, an AID reserved bit can be set in each AID sequence segment. For example, for an AID sequence from 0 to 2007, if it is assumed that the quantity of stations providing the periodic services and the quantity of stations providing the non-periodic services are 600 and 200 respectively, the periodic segment and the non-periodic segment are from 0 to 1505 and from 1506 to 2007 respectively, and the periodic segment has 906 reserved bits; likewise, when the periodic segment is further segmented, the 906 reserved bits may be set in each segment according to a ratio of subsequent allocation. Secondly, after the periodic segment is determined, the AP separately determines the quantity of stations with different service period duration, and further segments the periodic segment according to a ratio between the quantities of stations with different service period duration.

Optionally, after segmenting is performed according to different service period duration, each service period duration segment can further be segmented according to a ratio between the quantities of stations with different service duration within each service period duration segment. Further, each segment can further be adjusted according to a service offset time between stations, so that AIDs of STAs in a same period and with a small offset are contiguous. Then, the AP collects statistics of performance parameters (channel utilization rate, delivery rate, and the like) of a network, and adjusts current segments again, thereby optimizing performance of the network.

203: The AP allocates, to stations that belong to a same AID segment, AIDs with contiguous sequence numbers in the AID segment.

After segmenting the AID sequence is complete, the AP determines, according to the service period information of each station, an AID segment with which each station separately matches, and allocates, to the stations that belong to the same AID segment, the AIDs with contiguous sequence numbers in the AID segment.

204: The AP sends an AID allocation message to a target station.

After allocating, to the stations that belong to the same AID segment, the AIDs with contiguous sequence numbers in the AID segment, the AP determines the target station according to an AID allocation situation (for example, if a current AID of a station is inconsistent with a newly allocated AID of the station, it can be determined that the station is the target station), and sends the AID allocation message to the target station, where the AID allocation station carries a target AID (that is, the foregoing newly-allocated AID) of the target station, and the target station is a station to be allocated with an AID or a station with an AID to be updated.

Optionally, in an actual application, an OBSS scenario exists. If two stations within two BSSs are allocated with a same AID, an AID re-allocation mechanism provided by the present disclosure can be used to quickly perform AID re-allocation to avoid a conflict. Specifically, the AP can detect, in a service area of the AP, whether a situation in which a same AID is allocated to two stations within two BSSs exists; and if the situation exists, it is determined that either of the two stations is used as the target station.

Optionally, when a quantity of stations in an area served by the AP is larger than a quantity of AIDs, the AP can detect a station that does not run a service and is allocated with an AID, and allocate the AID of the station that does not run the service and is allocated with the AID to another target station.

Optionally, if the target station is a station to which an AID is allocated for the first time, the AID allocation message carries only the target AID of the target station, and the target station uses the target AID to associate with the AP when the target station receives the AID allocation message; and if the target station is not a station to which an AID is allocated for the first time, the AID allocation message may further carry a current AID of the target station, and the target station uses the target AID to update the current AID when the target station receives the AID allocation message.

Optionally, the AP may send the AID allocation message to each target station one by one in a unicast manner.

Optionally, if there are more than two target stations, the AP may send the AID allocation message to the target stations in a multicast manner, so that the target stations update AIDs according to the AID allocation message and return an AID update acknowledgement. Further, if the target stations do not return the AID update acknowledgement within preset time, after the sending the AID allocation message to the target stations in a multicast manner, it is determined whether there are more than two target stations that do not return the AID update acknowledgement, and if there are more than two target stations that do not return the AID update acknowledgement, framing is further performed for the target stations that do not return the AID update acknowledgement (that is, target AIDs corresponding to the target stations that do not return the AID update acknowledgement are further added into a multicast frame), and the AID allocation message is again sent, in a multicast manner, to the target stations that do not return the AID update acknowledgement; and if there is only one target station that does not return the AID update acknowledgement, framing is performed for the target station that does not return the AID update acknowledgement (that is, a target AID corresponding to the target station that does not return the AID update acknowledgement is further added into a unicast frame), and the AID allocation message is sent, in a unicast manner, to the target station that does not return the AID update acknowledgement.

In a multicast scenario, to send information to a plurality of stations, the AP needs to include AIDs of all target stations in multicast information. If the AID re-allocation mechanism provided by the embodiment of the present disclosure is used, the AIDs of these stations can be contiguously allocated. In this way, when multicast information is subsequently sent to a same group of stations, only a start AID and an end AID need to be included, thereby achieving compression of a data packet and improving information sending efficiency.

205: The AP receives an AID request message sent by a 'station to be updated'.

Optionally, when a service running on a station changes, the station may actively send an AID request message to the AP, so that the AP re-allocates, to the station, an AID matching a new service after the update (an allocation principle is that a sequence number of the newly-allocated AID is contiguous with an AID sequence number of a homogeneous station providing the new service), where the station that actively initiates the AID update is the 'station to be updated'.

The AP receives the AID request message sent by the 'station to be updated'. Optionally, the AID request message may carry service period information of the new service of the 'station to be updated' after the service update.

206: The AP acquires the service period information of the new service of the 'station to be updated' after the service update.

Optionally, the AP acquires the service period information of the new service of the 'station to be updated' after the service update. Optionally, if the AID request message carries the service period information, the service period information is extracted from the AID request message; and if the AID request message carries the service period information, the AP can obtain the service period information of the new service of the 'station to be updated' after the service update by sending a query message to the 'station to be updated'.

207: The AP searches for, according to the service period information, the AID allocated to the 'station to be updated'.

Optionally, the AP determines, according to the service period information, an AID segment matching the 'station to be updated', selects an idle AID that is contiguous with the allocated AID from the AID segment, and allocates the idle AID to the 'station to be updated'. Because an idle AID number is reserved in each AID segment when the AID sequence is segmented, the idle AID that is contiguous with the allocated AID can be directly allocated to the 'station to be updated' when the AID is allocated to the 'station to be updated'.

The access point in the embodiment of the present disclosure may collect statistics of service period information of each station, segment the AID sequence according to the service period information, and allocate, to the stations in a same AID segment, AIDs with contiguous sequence numbers in the AID segment, so as to make AID sequence numbers corresponding to stations that are about to receive downlink data within a same time segment be contiguous as far as possible, thereby improving bitmap compression efficiency when bitmaps corresponding to the AIDs are compressed (contiguous "1"s can be compressed).

Figure 3:
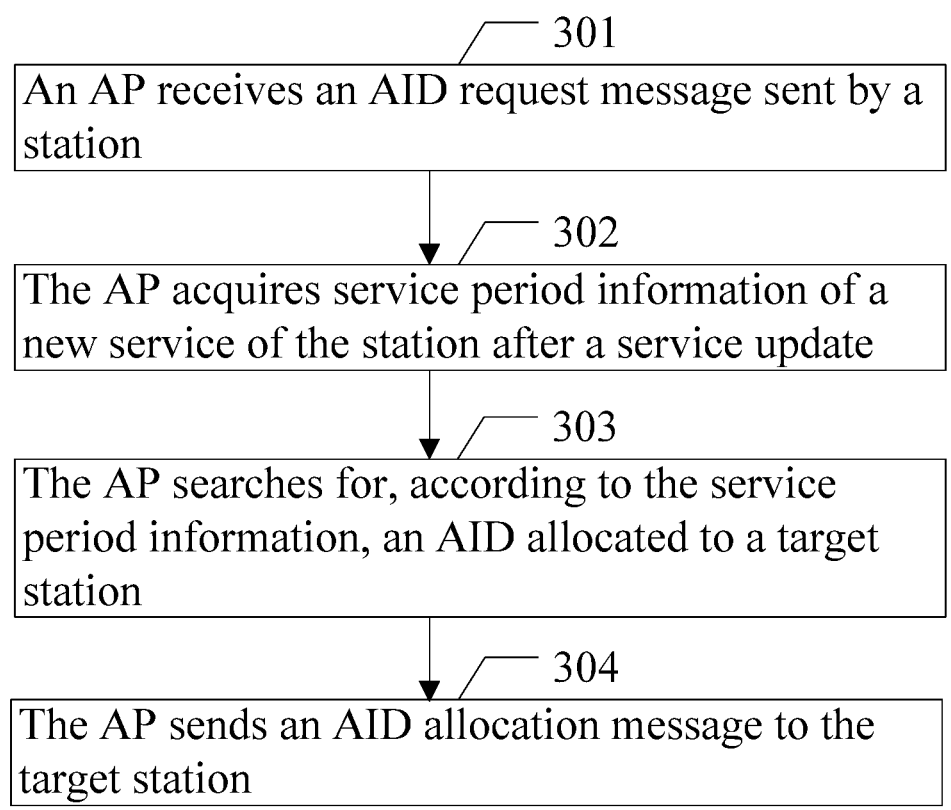
FIG. 3 is another schematic flowchart of a method for allocating an association identifier according to an embodiment of the present disclosure.

Referring to FIG. 3, another embodiment of the method for allocating an association identifier according to the embodiment of the present disclosure includes 301: An AP receives an AID request message sent by a station.

The AP receives the AID request message sent by the station, and determines the station sending the AID request message as a target station. When a service running on the station changes, the station may actively send the AID request message to the AP, so that the AP re-allocates, to the station, an AID matching a new service after the update.

302: The AP acquires service period information of the new service of the station after the service update.

The AP acquires the service period information of the new service of the target station after the service update. Optionally, if the AID request message carries the service period information, the service period information is extracted from the AID request message; and if the AID request message carries the service period information, the AP can obtain the service period information of the new service of the target station after the service update by sending a query message to the target station.

303: The AP searches for, according to the service period information, the AID allocated to the target station.

The AP searches for a homogeneous station with the same service period information as the target station according to the service period information, and allocates an idle AID adjacent to an AID sequence number of the homogeneous station to the target station.

304: The AP sends an AID allocation message to the target station.

Content of step 304 in this embodiment is the same as the content of step 104 in the embodiment shown in FIG. 1, and is not further described herein.

Figure 4:
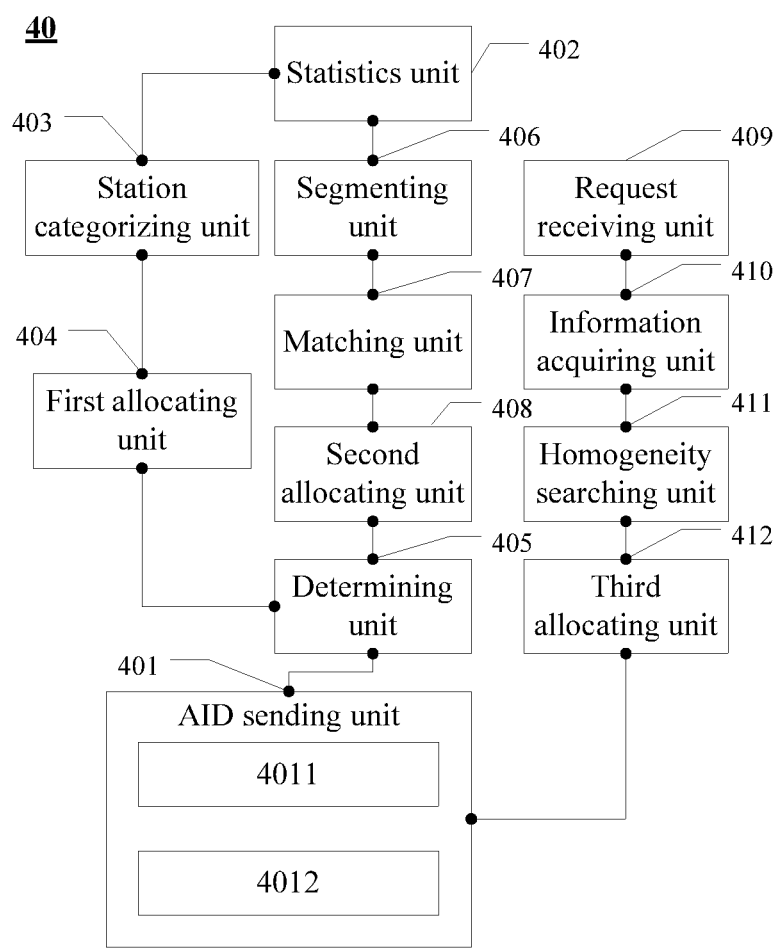
FIG. 4 is a schematic logical structural diagram of an access point according to an embodiment of the present disclosure.

The following describes an embodiment of an access point for executing the foregoing method for allocating an association identifier according to the present disclosure. A logical structure of the access point is shown in FIG. 4. An embodiment of an access point 40 in an embodiment of the present disclosure includes an AID sending unit 401 configured to send an association identifier AID allocation message to a target station, where the AID allocation message carries a target AID of the target station, and the target station is a station to be allocated with an AID or a station with an AID to be updated.

Optionally, the access point may further include: a statistics unit 402 configured to collect statistics of service period information of each station; a station categorizing unit 403 configured to categorize stations according to the service period information of the stations; a first allocating unit 404 configured to allocate AIDs with contiguous sequence numbers to stations that belong to a same category, and trigger a determining unit 405; and the determining unit 405 configured to determine the target station according to AID allocation.

Optionally, the access point may further include: a statistics unit 403 configured to collect statistics of service period information of each station; a segmenting unit 406 configured to segment an AID sequence according to the service period information; a matching unit 407 configured to determine an AID segment with which each station separately matches; and a second allocating unit 408 configured to allocate, to stations that belong to a same AID segment, AIDs with contiguous sequence numbers in the AID segment, and trigger the determining unit 405.

Optionally, the access point further includes a request receiving unit 409 configured to receive an AID request message sent by a station, and determine the station sending the AID request message as the target station; an information acquiring unit 410 configured to acquire service period information of the target station; a homogeneity searching unit 411 configured to search for a homogeneous station with the same service period information as the target station according to the service period information; and a third allocating unit 412 configured to allocate an AID adjacent to an AID sequence number of the homogeneous station to the target station, and trigger the AID sending unit 401.

Optionally, the AID sending unit 401 may include: a multicast sending module 4011 configured to send the AID allocation message to the target station in a multicast manner, so that the target station updates the AID according to the AID allocation message and returns an AID update acknowledgement; and a unicast sending module 4012, configured to send the AID allocation message to the target station in a unicast manner, so that the target station updates the AID according to the AID allocation message.

A specific interaction process of units of the access point in the embodiment of the present disclosure is as follows:

The AID sending unit 401 sends the AID allocation message to the target station, where the AID allocation message carries the target AID of the target station, the target AID is an AID to be used by the target station, and the target station is a station to be allocated with an AID or a station with an AID to be updated.

Optionally, if the target station is a station to which an AID is allocated for the first time, the AID allocation message carries only the target AID of the target station, and the target station uses the target AID to associate with the AP when the target station receives the AID allocation message; and if the target station is not a station to which an AID is allocated for the first time, the AID allocation message may further carry a current AID of the target station, and the target station uses the target AID to update the current AID when the target station receives the AID allocation message.

The embodiment of the present disclosure provides a plurality of mechanisms for reasonably allocating AIDs, including:

The statistics unit 402 collects statistics of the service period information of each station, where the service period information indicates a running period, duration, and various service time-related information of a service of the station. In an actual application, for services with a same service type, the service period information is also the same. Therefore, the AP may also learn the service period information of the station by acquiring a service type and TSPEC of the station. Specifically, the service period information may include a periodic service identifier and service period duration, where the periodic service identifier is used to mark whether the service of the station is a periodic service, and the service period duration is used to indicate duration of an interval between two downlink data transmissions for a service. Optionally, the service period information may further include service duration.

Optionally, in an actual application, the AP may request, by sending a query instruction to each station, each station to report service period information of a current ongoing service of each station; while each station may also actively report the service period information of the current ongoing service of each station to the AP in a periodic manner, or each station reports the service period information to the AP when performing association (association) with the AP. A manner for the AP to collect statistics of the service period information of each station can be determined according to an actual situation, which is not specifically limited herein.

The station categorizing unit 403 categorizes stations according to the service period information of the stations. Optionally, a specific method for categorization may be:

Firstly, a station running a periodic service may be distinguished, according to a periodic service identifier, from a station running a non-periodic service; secondly, among stations running periodic services, stations with same service period duration may further be categorized into one category. Optionally, after the stations with the same service period duration are categorized into one category, further, among the stations with the same service period duration, stations with same service duration may further be categorized into one category.

It can be understood that another method may also be used to categorize stations according to the service period information. A specific method can be determined according to an actual situation, which is not limited herein.

The first allocating unit 404 allocates AIDs with contiguous sequence numbers to stations that belong to a same category, and triggers the determining unit 405 to determine the target station according to an AID allocation situation.

Optionally, in an actual application, an OBSS scenario exists. If two stations within two BSSs are allocated with a same AID, an AID re-allocation mechanism provided by the present disclosure can be used to quickly perform AID re-allocation to avoid a conflict. Specifically, the AP can detect, in a service area of the AP, whether a situation in which a same AID is allocated to two stations within two BSSs exists; and if the situation exists, it is determined that either of the two stations is used as the target station.

Optionally, when a quantity of stations in an area served by the AP is larger than a quantity of AIDs, the AP can detect a station that does not run a service and is allocated with an AID, and allocate the AID of the station that does not run the service and is allocated with the AID to another target station.

After the target station is determined, the AID sending unit 401 sends the AID allocation message to the target station, where the AID allocation message carries the target AID of the target station. Specifically, the unicast sending module 4012 may be used to send the AID allocation message to the target station in a unicast manner, so that the target station updates the AID according to the AID allocation message; and the multicast sending module 4011 may also be used to send the AID allocation message to the target station in a multicast manner, so that the target station updates the AID according to the AID allocation message and returns an AID update acknowledgement. If there are more than two target stations, the AP may send the AID allocation message to the target stations in a multicast manner, so that the target stations update AIDs according to the AID allocation message and return an AID update acknowledgement; further, if the target stations do not return the AID update acknowledgement within preset time, after the sending the AID allocation message to the target station in a multicast manner, it is determined whether there are more than two target stations that do not return the AID update acknowledgement, and if there are more than two target stations that do not return the AID update acknowledgement, framing is further performed for the target stations that do not return the AID update acknowledgement (that is, target AIDs corresponding to the target stations that do not return the AID update acknowledgement are further added into a multicast frame), and the AID allocation message is again sent, in a multicast manner, to the target stations that do not return the AID update acknowledgement; and if there is only one target station that does not return the AID update acknowledgement, framing is performed for the target station that does not return the AID update acknowledgement (a target AID corresponding to the target station that does not return the AID update acknowledgement is further added into a unicast frame), and the AID allocation message is sent, in a unicast manner, to the target station that does not return the AID update acknowledgement.

When the target station receives the AID allocation message, the target station uses the target AID to associate with the AP. If the target station is not a station to which an AID is allocated for the first time, the AID allocation message may further carry a current AID of the target station, and the target station uses the target AID to update the current AID when the target station receives the AID allocation message.

The statistics unit 403 collects statistics of the service period information of each station, where the service period information indicates a running period, duration, and various service time-related information of a service of the station. In an actual application, for services with a same service type, the service period information is also the same. Therefore, the AP may also learn the service period information of the station by acquiring a service type and TSPEC of the station. Specifically, the service period information may include a periodic service identifier and service period duration, where the periodic service identifier is used to mark whether the service of the station is a periodic service, and the service period duration is used to indicate duration of an interval between two downlink data transmissions for a service. Optionally, the service period information may further include service duration.

Optionally, in an actual application, the AP may request, by sending a query instruction to each station, each station to report service period information of a current ongoing service of each station; while each station may also actively report the service period information of the current ongoing service of each station to the AP in a periodic manner, or each station reports the service period information to the AP when performing association (association) with the AP. A manner for the AP to collect statistics of the service period information of each station can be determined according to an actual situation, which is not specifically limited herein.

The segmenting unit 406 segments an AID sequence according to the service period information. Specifically, a method for segmenting the AID sequence may be as follows:

Firstly, a quantity of periodic services and a quantity of non-periodic services are determined according to the periodic service identifier, and the AID sequence is segmented into a periodic segment and a non-periodic segment according to a ratio of the quantity of the periodic services to the quantity of the non-periodic services. When the AID sequence is segmented, an AID reserved bit can be set in each AID sequence segment. For example, for an AID sequence from 0 to 2007, if it is assumed that the quantity of stations providing the periodic services and the quantity of stations providing the non-periodic services are 600 and 200 respectively, the periodic segment and the non-periodic segment are from 0 to 1505 and from 1506 to 2007 respectively, and the periodic segment has 906 reserved bits; likewise, when the periodic segment is further segmented, the 906 reserved bits may be set in each segment according to a ratio of subsequent allocation. Secondly, after the periodic segment is determined, the quantity of stations with different service period duration is separately determined, and the periodic segment is further segmented according to a ratio between the quantities of stations with different service period duration.

Optionally, after segmenting is performed according to different service period duration, each service period duration segment can further be segmented according to a ratio between the quantities of stations with different service duration within each service period duration segment. Further, each segment can further be adjusted according to a service offset time between stations, so that AIDs of STAs in a same period and with a small offset are contiguous. Then, the AP collects statistics of performance parameters (channel utilization rate, delivery rate, and the like) of a network, and adjusts current segments again, thereby optimizing performance of the network.

The matching unit 407 determines, according to the service period information of each station, an AID segment with which each station separately matches, and the second allocating unit 408 allocates, to stations that belong to a same AID segment, AIDs with contiguous sequence numbers in the AID segment, and triggers the determining unit 405.

After the target station is determined, the AID sending unit 401 sends the AID allocation message to the target station, where the AID allocation message carries the target AID of the target station.

The request receiving unit 409 receives an AID request message sent by a station, and determines the station sending the AID request message as the target station. When a service running on the station changes, the station may actively send the AID request message to the AP, so that the AP re-allocates, to the station, an AID matching a new service after the update.

The information acquiring unit 410 acquires the service period information of the new service of the target station after the service update. Optionally, if the AID request message carries the service period information, the service period information is extracted from the AID request message; and if the AID request message carries the service period information, the service period information of the new service of the target station after the service update can be obtained by sending a query message to the target station.

The homogeneity searching unit 411 searches for a homogeneous station with the same service period information as the target station according to the service period information; and then the third allocating unit 412 allocates an AID adjacent to an AID sequence number of the homogeneous station to the target station, and triggers the AID sending unit 401.

Figure 5:
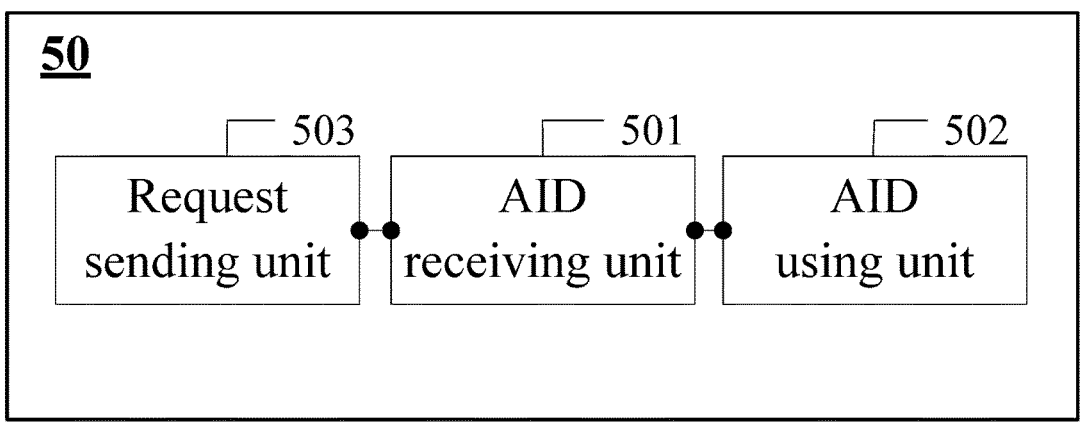
FIG. 5 is a schematic logical structural diagram of a station according to an embodiment of the present disclosure.

The following describes an embodiment of a station for executing the foregoing method for allocating an association identifier according to the present disclosure. A logical structure of the station is shown in FIG. 5. An embodiment of a station 50 in an embodiment of the present disclosure includes an AID receiving unit 501 configured to receive an AID allocation message sent by an AP, where the AID allocation message carries a target AID of the station; and an AID using unit 502 configured to use the target AID to associate with the AP, or use the target AID to update a current AID of the station.

Optionally, the station further includes a request sending unit 503 configured to send an AID request message to the AP, so that the AP re-allocates an AID to the station.

Because the station and the AP implement an interactive operation, for a specific operation process of the station, reference may be made to the embodiments shown in FIG. 1 to FIG. 3, and details are not further described herein.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The software product is stored in a storage medium and includes several instructions for instructing a computer device (which may be a personal computer, a server, a network device, or the like) to perform all or a part of the steps of the methods described in the embodiments of the present disclosure. The storage medium includes any medium that can store program code, such as a USB (universal serial bus) flash drive, a removable hard disk, a read-only memory (ROM), a random access memory (RAM), a magnetic disk, or an optical disc.

What is claimed is:

1. A method for allocating an association identifier (AID), comprising:
    obtaining, by an access point (AP), service period information of a target station, wherein the target station is a station with an AID to be updated, and wherein the service period information is service period information of a new service of the target station after a service update;
    determining, by the AP, an AID to be allocated to the target station according to the service period information; and
    sending, by the AP, an AID allocation message to the target station, wherein the AID allocation message carries the AID to be allocated to the target station.

2. The method according to claim 1, wherein obtaining the service period information of the target station comprises receiving an AID request message, wherein the AID request message is sent by the target station, and wherein the AID request message carries the service period information of the target station.

3. The method according to claim 1, wherein determining the AID to be allocated to the target station according to the service period information comprises:
    determining a similar station according to the service period information, wherein service period information of the similar station is the same as the service period information of the target; and
    determining an AID to be allocated to the target station, and wherein the AIDs of the target station and the similar station belong to a same AID segment.

4. An access point (AP), comprising:
    a memory storing instructions; and
    a processor coupled to the memory and configured to execute the instructions to:
        obtain service period information of a target station, wherein the target station is a station with an association identifier (AID) to be updated, and wherein the service period information is service period information of a new service of the target station after a service update;
        determine an AID to be allocated to the target station according to the service period information; and
        send an AID allocation message to the target station, wherein the AID allocation message carries the AID to be allocated to the target station.

5. The AP according to claim 4, wherein the processor is further configured to execute the instructions to receive an AID request message, wherein the AID request message is sent by the target station, and wherein the AID request message carries the service period information of the target station.

6. The AP according to claim 4, wherein in determining the AID to be allocated to the target station according to the service period information, the processor is configured to:
    determine a similar station according to the service period information, wherein service period information of the similar station is the same as the service period information of the target; and
    determine an AID to be allocated to the target station, and wherein the AIDs of the target station and the similar station belong to a same AID segment.

7. A method for allocating an association identifier (AID), comprising:
    sending, by a station, an AID request message to an access point (AP), wherein the AID request message carries service period information of a target station, and wherein the service period information is configured to determine an AID to be allocated to the target station;
    receiving, by the station, an AID allocation message, wherein the AID allocation message carries the AID to be allocated to the station; and
    updating, by the station, a current AID of the station using the AID allocated to the station.

8. A station, comprising:
    a memory storing instructions; and
    a processor coupled to the memory to execute the instructions to:
        send an association identifier (AID) request message to an Access Point (AP), wherein the AID request message carries service period information of a target station, and wherein the service period information is configured to determine an AID to be allocated to the target station;
        receive an AID allocation message, wherein the AID allocation message carries the AID to be allocated to the station; and
        update a current AID of the station using the AID allocated to the station.

* * * * *

UNITED STATES PATENT AND TRADEMARK OFFICE
CERTIFICATE OF CORRECTION

PATENT NO. : 9,854,614 B2
APPLICATION NO. : 15/358904
DATED : December 26, 2017
INVENTOR(S) : Tianyu Wu, Changle Li and Hui Han Page 1 of 1

It is certified that error appears in the above-identified patent and that said Letters Patent is hereby corrected as shown below:

On the Title Page

At page 2, Column 1, Line 2 under Other Publications should read:
Wu, T., et al., "Service Type Indication in Association," XP017671897, IEEE 802.11-12/0612r0, May 2012, 8 pages.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*